United States Patent [19]
Jackson et al.

[11] Patent Number: 5,229,883
[45] Date of Patent: Jul. 20, 1993

[54] HYBRID BINARY OPTICS COLLIMATION FILL OPTICS

[75] Inventors: John E. Jackson, Hazelwood, Mo.; James S. Foresi, Brookline, Mass.; Gordon H. Burkhart, St. Louis, Mo.

[73] Assignee: McDonnell Douglas Corporation, St. Louis, Mo.

[21] Appl. No.: 783,394

[22] Filed: Oct. 28, 1991

[51] Int. Cl.$^5$ .............................................. G02B 5/18
[52] U.S. Cl. .................................. 359/569; 359/574; 359/742
[58] Field of Search ............... 359/565, 566, 568, 569, 359/574, 575, 741, 742, 619, 623

[56] References Cited

U.S. PATENT DOCUMENTS

| | | | |
|---|---|---|---|
| 3,985,421 | 10/1976 | Beecher | 359/414 |
| 4,185,891 | 1/1980 | Kaestner | 359/619 |
| 5,022,740 | 6/1991 | Maziorka | 359/440 |
| 5,044,706 | 9/1991 | Chen | 359/356 |
| 5,066,100 | 11/1991 | Ferrante | 359/566 |
| 5,081,639 | 1/1992 | Snyder et al. | 359/708 |

OTHER PUBLICATIONS

Binary Optics Technology: The Theory & Design of Multi-Level Diffractive Optical Elements-G. J. SwansOn MIT-Lincoln Lab Tech. Report Aug. 14, 1989.

Veldkamp et al., "Binary Optics", May 1992, *Scientific American*, pp. 92-97.

*Primary Examiner*—Bruce Y. Arnold
*Assistant Examiner*—J. P. Ryan
*Attorney, Agent, or Firm*—Benjamin Hudson, Jr.; Timothy H. Courson

[57] ABSTRACT

A cylindrical lens and a binary optical element for collimating with low optical aberrations an asymmetrically diverging input wavefront. The binary optical element is formed on a planar substrate on which a binary optical diffraction pattern is etched on the front surface thereof. The binary optical diffraction pattern is designed such that each ray of light from the diverging input light source will travel the same optical path length or vary from that optical path length by an integer multiple of the wavelength of the light in travelling from its source to its exit from the front surface of the binary optical element. A beam angle alignment element is also provided, to be utilized in conjunction with a cylindrical lens and the binary optical element, for correcting angular misalignments of diode lasers whose output wavefront has an optical axis which is either above or below the plane in which the active region is formed. The beam angle alignment element is also a planar substrate on which a binary optic diffraction pattern is etched. The binary optic diffraction pattern of the beam angle alignment elements diffracts the wavefront exiting from the binary optic element so as to align the wavefront about its optical axis. The cylindrical lens, the binary optical element, as well as the beam angle alignment element may be used in conjunction with a single diode lasing element, as well as a one dimensional or a two dimensional diode laser array.

14 Claims, 2 Drawing Sheets

HYBRID BINARY OPTICS COLLIMATION FILL OPTICS

BACKGROUND OF THE INVENTION

The present invention relates generally to means for collimating, aberration correcting, and angularly aligning the output of a diode laser array, and more particularly to a combination of a cylindrical lens and a pair of binary optical elements which are optimized to collimate, aberration correct, and align the individual diodes of a diode laser array such that each individual diode fills its aperture.

Many optical sources such as diode lasers produce asymmetrically divergent beams. Diode lasers are currently utilized in many applications. Many of these applications require collimated diode laser outputs with low optical aberrations even though diode lasers typically produce asymmetrically diverging output beams. In many instances this asymmetric divergence may be quite fast, such as an 80 degree output fan along the fast axis and a 20° output fan along the slow axis of an individual diode laser. These applications also typically require the higher power produced by a diode laser array which for most efficient operation requires the output of the individual diode lasers to fill its aperture such that a planar wavefront of fairly constant intensity is produced instead of an array of individual pinpoints of light wherein each pinpoint emanates from an individual diode laser which has not filled its aperture.

There have been a variety of proposed optical design solutions to collimate with low optical aberrations the asymmetrically diverging wavefront's of diode lasers. One proposed solution utilizes conventional cylindrical lenses to collimate each axis, the fast and the slow axes, independently. If such lenses were used with a rectangular laser diode array each cylindrical lens would collimate a row or a column of laser diode sources. However, the performance of such conventional cylindrical lenses is greatly reduced once the slow axis divergence exceeds approximately a 7 degree full angle measured at the position on the Gaussian output distribution of the laser diode which is 10% of the maximum output value. This reduction in performance is due to skew rays which cannot properly be collimated by either the fast or the slow axes of crossed cylindrical lenses.

Additionally, for more efficient collimation of the fast axis, acylindrical lenses must be fabricated to eliminate spherical aberration. These small cylinders, however, are difficult to produce accurately and affordably.

Another approach for producing an optical element for collimating a divergent output is to mold plastic or glass aspheric optical elements in the shape desired in order to collimate the divergent output beam. An example of such a molded glass optical element is discussed in "Precision Molded-Glass Optics," written by R. Maschmeyer, et al. in Applied Optics, Volume 22, No. 6, on page 2410 in 1983. The glass optic elements which have been molded are generally limited in their ability to collimate a divergent output beam, however, due to stresses inherent in the glass element from the molding process. Additionally, molded plastic optical elements, while easier to mold than the relatively difficult to mold glass elements, tend to deform when subjected to high temperatures. Such deformation limits the plastic elements ability to collimate diode laser's output since high temperatures would often be experienced when the optical element was placed adjacent to the emitting facet of the diode laser.

An additional problem with compact two dimensional laser diode arrays which are arranged in substantially linear columns and rows of laser diodes, which is not addressed by the aforementioned collimation optical elements, is the exhibition of nonlinear bowing of the linear rays such that the diodes are no longer horizontally aligned. The nonlinear bowing of the laser diode array introduces an angular misalignment of the individual diodes upon collimation.

The angular misalignment is due to differences in the vertical position of the output beams of the individual laser diodes as they are being collimated. For example, a linear laser array with a substantially horizontal output that does not suffer from nonlinear bowing will produce a series of output beams that will propagate in the substantially horizontal plane positioned in the plane in which the active layer of the diode array exists. In contrast, laser diodes within the same exemplary laser array that are bowed or misaligned will produce output beams that will be positioned above or below the horizontal plane.

These directional errors of a non-linear "bowed" diode laser array may be corrected by individually fabricated microprism arrays in which individual prisms are placed in each diode's path. Each prism must then be positioned such that there is no angular misalignment upon collimation. The use of microprism arrays in this application is extremely labor intensive and therefore cost prohibitive. Microprism arrays also tend to be fragile and to delaminate with time and temperature cycling. Additionally, microprism arrays do not collimate or aberration correct the diode laser's output as required in numerous applications.

Therefore, it would be desirable to provide a combination of optical elements which are capable of collimating, with few optical aberrations, a highly divergent wavefront. Furthermore, it would be desirable if such collimating optical element would fill the aperture of each individual diode laser within a diode laser array so as to produce a substantially planar wavefront. It would also be desirable to develop an optical element for use in conjunction with the collimating and aberration correcting optical element to correct diode laser arrays which exhibit nonlinear bowing so that the resulting output would be angularly aligned with respect to the plane in which the active region of the individual diode laser lies.

SUMMARY

There is provided by this invention a cylindrical lens and a binary optical element for collimating with low optical aberrations an asymmetrically diverging input wavefront. The cylindrical lens may be of a convex planar design or of a biconvex design. The binary optical element is formed on a planar substrate on which a binary optical diffraction pattern is etched on the front surface thereof. The binary optical diffraction pattern is designed such that each ray of light from the diverging input light source will travel the same optical path length or vary from that optical path length by an integer multiple of the wavelength of the light in travelling from its source to its exit from the front surface of the binary optical element. The combination of the cylindrical lens and the binary optical element collimates both the fast and the slow axis divergence of the diode laser and corrects aberrations of the laser's output. Additionally, the cylindrical lens and the binary optical element fill the diode laser aperture so as to provide a substantially constant intensity output wavefront which is in-phase.

The present invention also provides for a beam angle alignment element to be utilized in conjunction with the cylindrical lens and the binary optical element for correcting angular misalignments of diode lasers whose output wavefront has an optical axis which is either above or below the plane in which the active region is formed. The beam angle alignment element is also a planar substrate on which a binary optic diffraction pattern is etched. The binary optic diffraction pattern of the beam angle alignment elements diffracts the wavefront exiting from the binary optic element so as to align the wavefront about its optical axis in the plane established by the active region layer of the diode laser. This diffraction by the beam angle alignment element is done while maintaining the phase relationship and the optical path distance relationship of the rays of light within the wavefront.

The cylindrical lens, the binary optical element, as well as the beam angle alignment element may be used in conjunction with a single diode lasing element, as well as a one dimensional or a two dimensional diode laser array. In any instance the optical elements produce a collimated and aberration corrected light wavefront which is angularly aligned along the optical axis which lies in the plane in which the active regions of the diode lasers reside. Furthermore, the light wavefront emitted from the optical elements fills the diode lasers aperture so that a fairly uniform intensity and in phase wavefront is produced.

DETAILED DESCRIPTION OF THE PREFERRED EMBODIMENT

Figure 1:
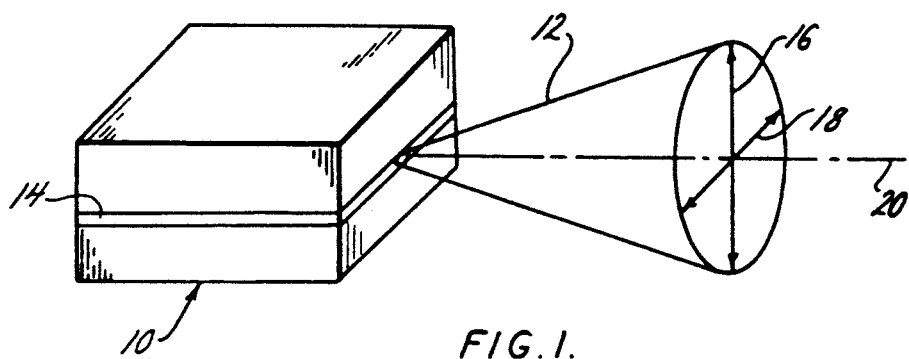
FIG. 1 is a perspective view of a diode laser illustrating its asymmetric diverging fan output.

As shown in FIG. 1, the output of a diode laser 10 typically forms an asymmetrically diverging fan 12. The asymmetrical divergence of a diode laser with an active region 14 located in a horizontal plane produces a much larger divergence along the vertical axis 16 than along the horizontal axis 18. While the slow horizontal divergence may be typically collimated with spherical optical elements with few resulting aberrations, the collimation of the fast vertical divergence requires optical elements with increased optical power and thus a much lower F/# which generally results in increased optical aberrations in the collimated output. Additionally, the output of a diode laser 10 may be angularly misaligned from the horizontal plane in which the active region 14 is positioned. This angular misalignment results in the optical axis 20 of the diode laser being either above or below the horizontal plane in which a correctly aligned diode laser's output would reside.

Figure 2:
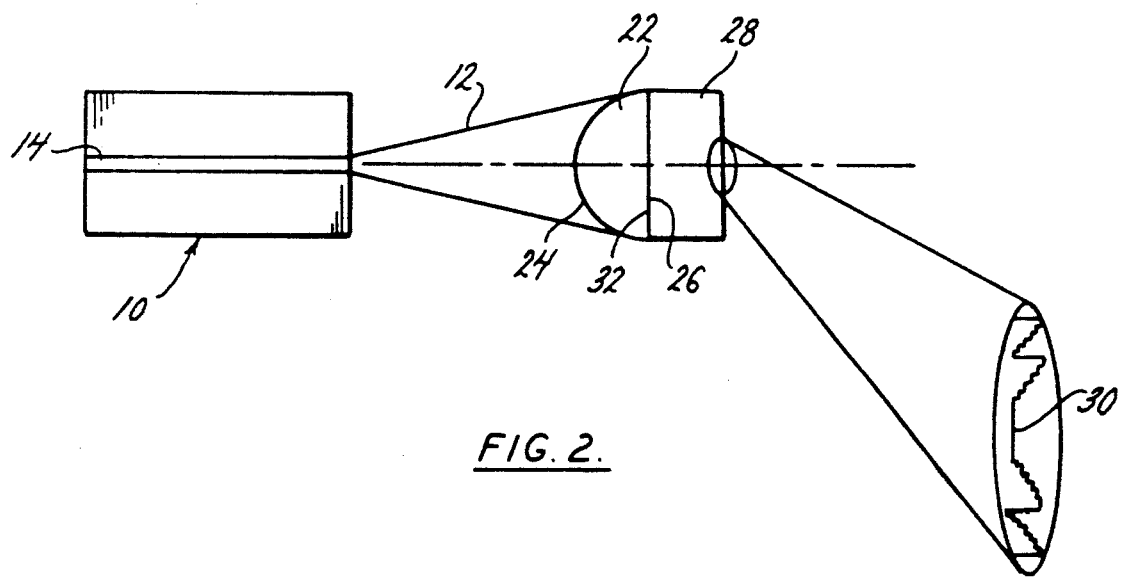
FIG. 2 is a side view of a diode laser, cylindrical lens, and binary optic element incorporating the principles of this invention.

The present invention as illustrated in FIG. 2 is a combination of optical elements to collimate and eliminate optical aberrations in the output of a diode laser 10 or array of diode lasers. An optical element of the present invention is also provided for use with the collimating and aberration correcting optical elements which will correct for angular misalignment of diode lasers either individually or within an array. The optical elements comprising the present invention include a cylindrical lens 22 and a binary optic element. A beam angle alignment array may be added to the aforementioned elements in order to correct for angular misalignment, however, the cylindrical lens and the binary optic elements alone can provide sufficient collimation and aberration correction of a diode laser.

The cylindrical lens 22 is utilized to collimate the laser diode's output in the fast axis. Such a cylindrical lens 22 is typically formed from a cylindrical rod, so that the resulting lens is relatively inexpensive and when properly aligned, the cylindrical lens 22 may collimate the fast axis divergence of an individual diode laser 10 or an entire row of laser diodes within an array. The cylindrical lens 22 may be either convex planar as shown in FIG. 2, or biconvex as well known to those skilled in the art. When a convex planar lens is utilized as shown in FIG. 2, the convex side of the lens is typically the back surface 24, while the planar side of the lens is the front surface 26. This orientation of a lens is preferred so that the planar side may be placed in contact with another planar optical element. While the cylindrical lens 22 may be composed of a variety of materials as those skilled in the art are well aware, a typical type of glass from which such a lens is made are SF6 and LaSFN9. The requirements for the cylindrical lens 22 are only that the optical power of the lens, as determined by the lens' refractive index and the radius of curvature of the convex side of the lens or of both sides of the lens if the lens is of a biconvex type, is sufficient to collimate the diverging output 12 of a diode laser 10 along its fast axis 16.

The binary optical element 28 is comprised of a substrate on which a binary optical diffraction pattern 30 is etched. While the substrate of the binary optic element may be of any of a variety of materials, as well known to those skilled in the art, a suitable material is quartz silicon dioxide. The material of the binary optical element 28 should be selected so that its refractive index is substantially equivalent to the refractive index of the cylindrical lens such that minimal refraction occurs at the interface between the cylindrical lens 22 and the binary optical element 28. Alternatively, should the refractive indices of the cylindrical lens 22 and the binary optical element 28 be constructed of material be different, the facing surfaces of the lens 22 and element 28 may be coated, as is well known to those skilled in the art to prevent refraction. The binary optical element 28 has a back surface 32 which is positioned adjacent to the front surface 26 of the cylindrical lens 22 and a front surface 34 on which the binary optic diffraction pattern 30 is etched.

The binary optical diffraction pattern 30 etched on the back surface 34 of the binary optical element 28 is done in accordance with typical binary optic technology as is well known to those skilled in the art. Details of such binary optic etching processes in the determination of the binary optic element diffraction pattern may be found in an article in Laser Focus World, August 1989, page 47. Also, further reference may be found in U.S. Pat. No. 4,847,552 issued to Veldkamp, et al, which described the generation of planar aspheric lens using binary optics technology. This patent by Veldkamp, et al is herein incorporated by reference.

While for purposes of illustration an eight-level binary optic diffraction pattern 30 will be discussed; two, four, or sixteen-level binary optic diffraction patterns may also be fabricated and utilized as is well known to those skilled in the art. The binary optic diffraction pattern 30 is typically an eight-phase level structure which corrects for optical path differences inherent in the divergent light 12. Thus, the rays of light which exit a binary optic element 28 have all traveled optical path lengths, defined as a physical path length multiplied by the index of refraction of the material through which the light ray travelled, which are equal or vary from that optical path length by only an integer multiple of the wavelength of light. The eight-level binary optic diffraction pattern 30 is shown schematically in FIG. 2. By performing the necessary collimation and aberration correction, the binary optic element 28 has also collimated the slow axis divergence 18 and corrected for skew ray aberration of rays not in either the fast or slow axis, 16 or 18 respectively. These additional corrections are inherent in a binary optic element 28 whose diffraction pattern 30 is chosen so as to have each optical ray travel an equal optical path length or an optical path length that varies, from that equal optical path length, by an integer multiple of the wavelength of light travelling therethrough.

In accordance with binary optics technology, the optical transformation affected by the binary optical diffraction pattern 30 is encoded as a set of three lithographic masks. The optical path difference of the diverging rays of light, upon their entry in the back surface 32 of the binary optic element 28, at various heights above the optical axis 20 of the diode laser 10 are calculated and analyzed by conventional optical raytrace computer programs which produce a wavefront phase map which in turn creates the masks as is well known to those in the art. The generation of the eight-level etched binary optical diffraction pattern 30 as shown in FIG. 2, utilizes sequential exposure to a first, second and third photolithographic mask with the first mask producing a two phase level structure, the second mask producing a four phase level structure, and the third mask producing a eight phase level structure.

Light output 12 from the diode laser 10 after emerging from the front surface 34 of the binary optical element 28 has been collimated and aberration corrected such that the output light is of substantially equal intensity across the wavefront as well as being in phase. By producing an output which is of substantially equal intensity across the wavefront, the aperture of the diode laser 10 is filled. The aperture is filled since, instead of the typical Gaussian output of a diode laser 10 which produces a much higher intensity at a very small spot along the optical axis 20 with increasingly diminished intensity values for the wavefront at positions removed from the optical axis 20 so that the output appears to be a pinpoint of light, the output light produced by this invention provides a larger area of light intensity which, while less than the original, peak intensity Gaussian output of the diode laser, is substantially constant across the aperture of the diode laser 10 while remaining Gaussian in distribution.

The binary optical element 28 and the cylindrical lens 22 must be aligned with the optical axis 20 of the diode laser 10 for best performance. Additionally, the cylindrical lens 22 and the binary optical element 28 are coated with an antireflection coating to enhance their performance. The cylindrical lens 22 and the binary optical element 28 may be held in relation to one another by any of the means typically used by those skilled in the art such as adhering the back surface 32 of the binary optical element 28 to the planar front surface 26 of a cylindrical lens 22 with an optical glue. Alternatively, a bracket means may be provided to hold the cylindrical lens 22 and the binary optical element 28 in a fixed relationship to one another while maintaining their alignment with the diode laser's optical axis 20.

As previously mentioned, the cylindrical lens 22 may be either of a biconvex type or a convex planar type as illustrated in FIG. 2. In an embodiment utilizing a biconvex cylindrical lens, appropriate calculations must be included in operating the conventional optical raytrace computer programs which produce the set of lithographic masks for producing the binary optical diffraction pattern. Such calculations must take into account the refraction of the light rays upon exiting the front surface 26 of the cylindrical lens 22 and upon entering the back surface 32 of the binary optical element 28 since the refractive index of the atmosphere surrounding the optical elements, typically air, has a different refractive index from those of the cylindrical lens 22 and the binary optical element 28.

Figure 3:
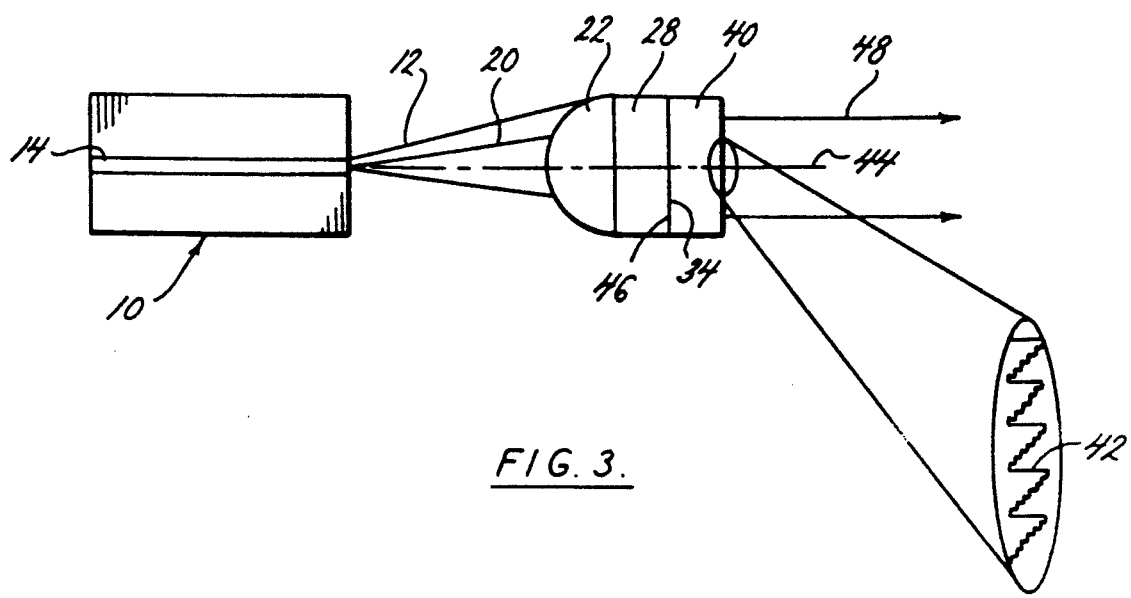
FIG. 3 is a side view of a diode laser, cylindrical lens, binary optic element, and a beam angle alignment element incorporating the principles of this invention.
Figure 4:
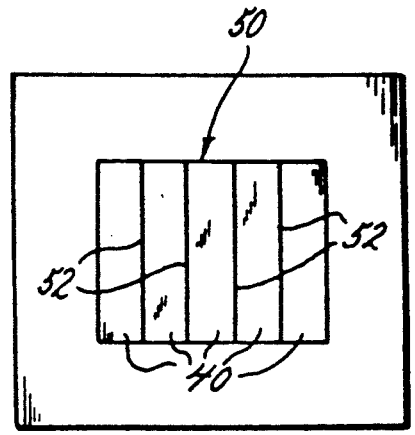
FIG. 4 is an end view of a one dimensional beam angle alignment array illustrating the principles of this invention.

While sufficient collimation and aberration correction is provided by the cylindrical lens 22 and the binary optical element 28, the output wavefront emanating from the front surface 34 of the binary optical element 28 may be angularly misaligned if the original laser diode structure 10 was angularly misaligned such that the optical axis of the emanating light is oriented at an angle with respect to the horizontal plane 44 about which the cylindrical lens 22, binary optical element 28 and diode laser 10 are oriented. Such angular misalignment, as shown in FIG. 3, may be corrected by means of a beam angle alignment element 40. Such an element 40 as shown in a side view in FIG. 3 and as an array in a end view in FIG. 4, corrects for angular misalignment of the optical axis 20 in a direction along the fast axis 16 of the diode laser 10. Such a beam angle alignment element is comprised of a substrate on which a binary optical diffraction pattern 42 is etched in the similar fashion to that discussed previously in conjunction with the binary optical element 28, however, the binary optic diffraction pattern 42 is not symmetric about the optical plane 44 as was binary optic diffraction pattern 30 of the binary optic element 28, but instead is a progression of multi-level binary optic patterns as shown in FIG. 4. Thus, the binary optic diffraction pattern 42 of the beam angle alignment element 40 behaves similar to an angular correcting prism, while binary optic pattern 30 of the binary optic element 28 behaves similar to a lens element.

As with the binary optic element 28, the beam angle alignment element 40 is comprised of a substrate, typically formed of quartz, on which a binary optic diffraction pattern 42 is produced. The binary optic diffraction pattern 42 is typically an eight-level structure, but may be a two, four, or sixteen-level structure as previously discussed. An eight-level binary optic diffraction pattern 42 is produced by three masks as previously explained. Once again, conventional optical ray-trace computer programs are utilized to produce a wavefront phase map corresponding to the diffraction required at various heights above the plane 44 in which the active region of the diode laser is located in order to realign the optical axis 20 of the light beam 12 such that it is positioned symmetrically about the plane 44. In order to maintain the collimation and aberration correction of the beam of light, the resultant output 48 of the beam angle alignment element 40 must maintain the phase relationship of the light beam such that each ray of light travels an equal optical path length or is only varied from that equal optical path length by an integer multiple of the wavelength of the light. The beam angle alignment element 40 has a planar front surface 46 which is positioned adjacent to the binary optic element 28 and the back surface 34 on which the binary optic diffraction pattern 30 is etched. In order for most efficient operation, the beam angle alignment element 40 must be aligned with the cylindrical lens 22 and the binary optic element 28 which have previously been aligned with the optical diode laser 10. Such alignment is performed in a manner well known to those skilled in the art.

Figure 5:
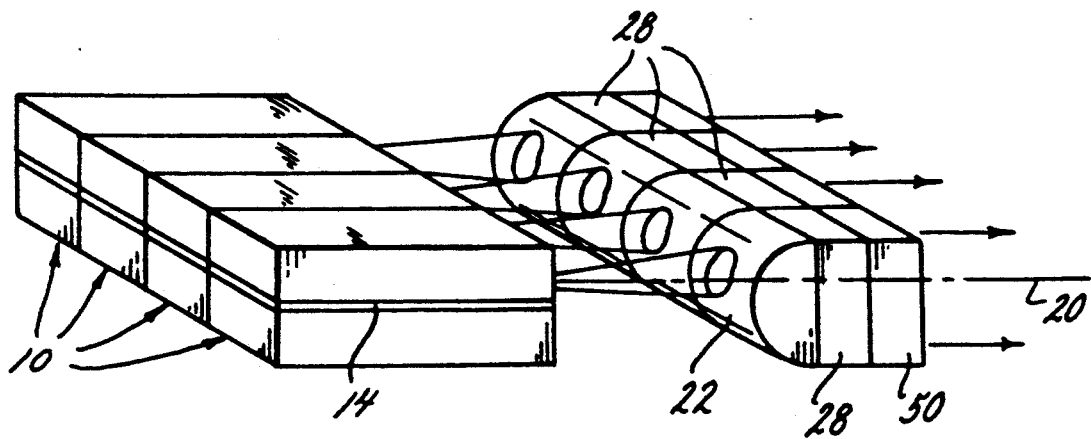
FIG. 5 is a perspective view of a one dimensional laser diode array and the optical elements incorporating the principles of this invention.

The combination of optical elements, discussed heretofore in conjunction with a single diode laser 10, has additional application with either a one dimensional, as shown in FIG. 5, or two dimensional array of diode lasing elements. As previously discussed, the cylindrical lens 22 may be cut from a typical cylindrical rod lens such that its length is sufficient to collimate an entire row of diode lasing elements in a one dimensional array. Similarly, a plurality of binary optical elements 28 could be fabricated such that there is an individual binary optical element for each diode lasing element in a one dimensional array. As shown in FIG. 4, the beam angle alignment elements 40 could be formed in an array upon a silica substrate so as to correct for angular misalignments for the one dimensional arrays of diode lasing elements. The individual beam angle alignment elements 40 contained within the beam angle alignment array 50, as shown in FIG. 4, may be fabricated so as to contact one another along lines 52 perpendicular to the plane in which the optical axis 20 of the diode lasing element 10 lies, such that there is no dead zone between adjacent beam angle alignment elements 40. Additionally, the width of the beam angle alignment elements 40 must be sufficient to align substantially all of the light emanating from the front surface 34 of the binary optical element 28 so as not to decrease the intensity of the diode lasing elements 10.

While the optical elements are discussed previously in conjunction with the one dimensional array, as shown in FIG. 5, the optical elements could be stacked so as to collimate, aberration correct, and correct for angular misalignment within a two dimensional array. By utilizing such optical elements with a diode laser arrays, a relatively uniformly filled output wavefront is produced which may be used in numerous applications, such as illumination and laser communication systems.

Although there has been illustrated and described specific detail and structure of operations it is clearly understood that the same were merely for purposes of illustration and that changes and modifications may be made readily therein by those skilled in the art without departing from the spirit and the scope of this invention.

I claim:

1. An optical lens system for collimating and redistributing a divergent input light comprising:

a) a cylindrical lens wherein said lens substantially collimates the divergent input light;
    b) a binary optical element, comprising a substantially planar substrate having a front surface wherein said front surface has been formed such that the optical path length traveled by each ray of divergent input light from a source of the divergent input light to a collimation plane is substantially equal; and
    c) a beam angle alignment element for aligning the divergent input light about an optical axis of the input light.

2. An optical lens system as recited in claim 1 wherein the beam angle alignment element is comprised of a planar substrate having a binary optic diffractive element etched thereon.

3. An optical lens system as recited in claim 2 wherein the binary optic diffractive element is selected from the group consisting of a two-phase level structure, a four-phase level structure, an eight phase level structure, and a sixteen phase level structure.

4. An optical lens system as recited in claim 3 wherein the substantially planar front surface has a binary optic diffractive element etched thereon.

5. An optical lens system as recited in claim 3 wherein the collimation plane is positioned such that the substantially planar front surface lies within the collimation plane.

6. An optical lens system as recited in claim 3 wherein the cylindrical lens has a first planar surface and a second convex surface.

7. An optical lens system as recited in claim 3 wherein the cylindrical lens is a biconvex cylindrical lens.

8. An array of optical lens systems for collimating and redistributing an array of divergent input light sources, comprising:

a) a plurality of cylindrical lenses wherein each of said lenses substantially collimate the divergent input light source;
    b) a plurality of binary optical elements, each of the binary optical elements comprising a substantially planar substrate having a front surface with a binary optic diffractive element etched thereon wherein said front surface has been formed such that the optical path length traveled by each ray of divergent input from a source of the divergent input light to a collimation plane is substantially equal, each of the binary optical elements positioned to receive a substantially collimated light beam from a corresponding cylindrical lens; and
    c) an array of beam angle alignment elements, each of the beam angle alignment elements positioned to align a light beam, emitted from a corresponding binary optical element, about an optical axis of a corresponding divergent input light source.

9. An array of optical lens systems as recited in claim 8 wherein each beam angle alignment element is comprised of a planar substrate having a binary optic diffractive element etched thereon.

10. An array of optical lens systems as recited in claim 9 wherein the substantially planar front surface of each binary optical element has a binary optic diffractive element etched thereon.

11. An array of optical lens systems as recited in claim 8 wherein the binary optic diffractive element is selected from the group consisting of a two-phase level structure, a four-phase level structure, an eight phase level structure, and a sixteen phase level structure.

12. An array of optical lens systems as recited in claim 11 wherein the collimation plane is positioned such that the substantially planar front surfaces of the plurality of binary optical elements lie within the collimation plane.

13. An array of optical lens systems as recited in claim 11 wherein each cylindrical lens of the plurality of cylindrical lenses has a first planar surface and a second convex surface.

14. An array of optical lens systems as recited in claim 11 wherein the each of the plurality of cylindrical lenses is a biconvex cylindrical lens.

* * * * *